No. 629,659. Patented July 25, 1899.
N. CHAMPAGNE.
STUMP EXTRACTOR AND CONVEYER.
(Application filed Feb. 20, 1899.)
(No Model.)
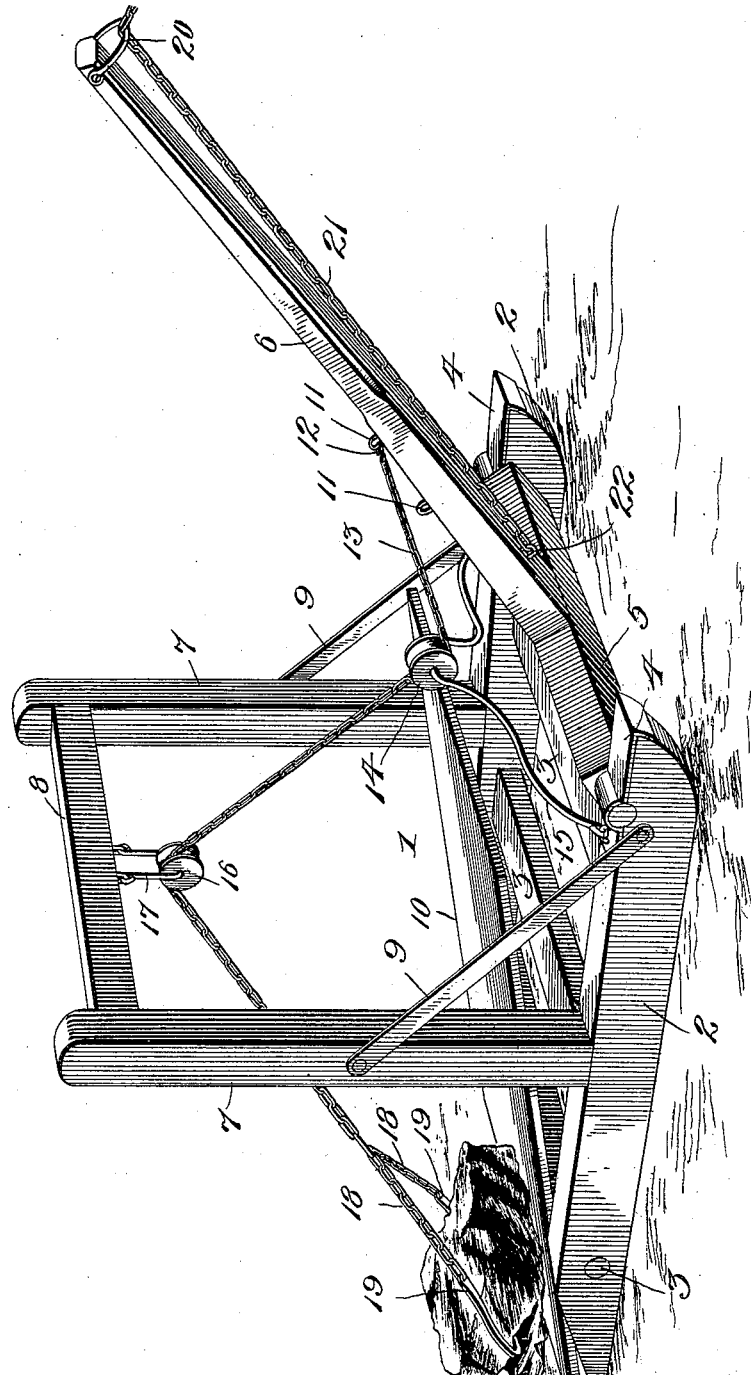
Witnesses:
Inventor
Norbert Champagne,
By Marion & Marion
Attorneys

UNITED STATES PATENT OFFICE.

NORBERT CHAMPAGNE, OF STE. MONIQUE, CANADA.

STUMP EXTRACTOR AND CONVEYER.

SPECIFICATION forming part of Letters Patent No. 629,659, dated July 25, 1899.

Application filed February 20, 1899. Serial No. 706,295. (No model.)

*To all whom it may concern:*

Be it known that I, NORBERT CHAMPAGNE, a subject of Her Majesty the Queen of Great Britain, residing at Ste. Monique, county of Nicolet, Province of Quebec, Canada, have invented certain new and useful Improvements in Stump Extractors and Conveyers; and I do hereby declare the following to be a full, clear, and exact description of the invention, such as will enable others skilled in the art to which it appertains to make and use the same.

My invention relates to improvements in stump extractors and conveyers.

The object of my invention is to provide a device of this character by means of which stumps or stones may be readily extracted and moved.

To these and other ends my invention consists in the improved construction and combination of parts hereinafter fully described, and particularly pointed out in the appended claims.

In the drawing the figure represents a perspective view of the device in position for operation.

1 designates a sled-body having the runners 2 connected by suitable strengthening-bars 3. The fronts of the runners are provided with bearings 4, within which is mounted a rotatable bar 5, to which is connected the tongue or lever 6, said lever extending forwardly a suitable distance. The runners 2 are provided approximately central of their top with uprights 7, connected at their upper ends by the cross-bar 8. Strengthening-braces 9 connect the uprights and the runners. A platform 10 is connected to the rear bar 3, which is pivoted in said runners and extends along the sled portion, normally resting on the bars 3.

The tongue or lever 6 is provided on its upper face with a series of eyes 11, into one of which the hook 12, connected to the front end of a chain or rope 13, is removably secured. The chain 13 extends rearwardly, being carried under an idler-pulley 14, mounted on a pivotally-mounted frame 15, thence upwardly and over a pulley 16, mounted on a frame 17, suspended from the cross-bar 8, the rear end of the chain 13 being provided with supplemental portions 18, each of which is provided with a grappling-hook 19, adapted to engage with the roots of the stump or the periphery of the stone.

In operating my device the sled is brought as close to the stump or stone as possible and the platform tilted, as shown in the drawing. The grappling-hooks are placed in proper position on the object to be extracted, the hook 12 being placed in the proper eye 11, the position of the lever or tongue being almost vertical. A draft-animal is connected in suitable manner to the swivel 20 at the front end of the tongue, and when the animal is driven forward the object will be raised and drawn onto the platform.

A supplemental rope or chain 21 is removably connected to an eye 22, formed on the under face of the tongue or lever, said chain extending forwardly under the tongue or lever, passed through the swivel, the front end of the chain being connected to a single or double tree, by means of which the sled is drawn forward. Although I make use of a chain, as just described, I do not limit myself to such construction, but may place a single or double tree to the tongue and attach the animals thereto.

The advantages of my construction are obvious, among them being the use of a device in which the power is connected to a frame in which the object can be moved away.

While I have herein shown a preferred form of carrying my invention into effect, yet I do not desire to limit myself to such preferred details of construction, but claim the right to use any and all modifications thereof which will serve to carry into effect the objects to be attained by this invention in so far as such modifications and changes may fall within the spirit and scope of my said invention.

Having thus described my invention, what I claim as new is—

1. A stump-extractor, comprising a sled portion; a platform pivotally mounted thereon; a tongue pivotally mounted in said sled, said tongue forming a lever for raising the object, and also forming the means for applying the draft power; and a chain adjustably connected to said tongue, said chain being provided with grappling-hooks, substantially as described.

2. A stump-extractor, comprising a sled portion; a platform pivotally mounted thereon; a tongue pivotally mounted in said sled, said tongue forming a lever for raising the object, and also forming the means for applying the draft power; a chain adjustably connected to said tongue, said chain being provided with grappling-hooks; and means, interposed between the ends of said chain, for holding said chain in position, whereby said chain will have the same movement regardless of the movement of said tongue, substantially as described.

In witness whereof I have hereunto set my hand in the presence of two witnesses.

NORBERT CHAMPAGNE.

Witnesses:
I. E. MARTCH,
J. W. DENIS.